F. L. JOHNSON.
DIRIGIBLE LAMP MECHANISM FOR AUTOMOBILES.
APPLICATION FILED JUNE 22, 1917.
1,245,729.
Patented Nov. 6, 1917.
2 SHEETS—SHEET 1.
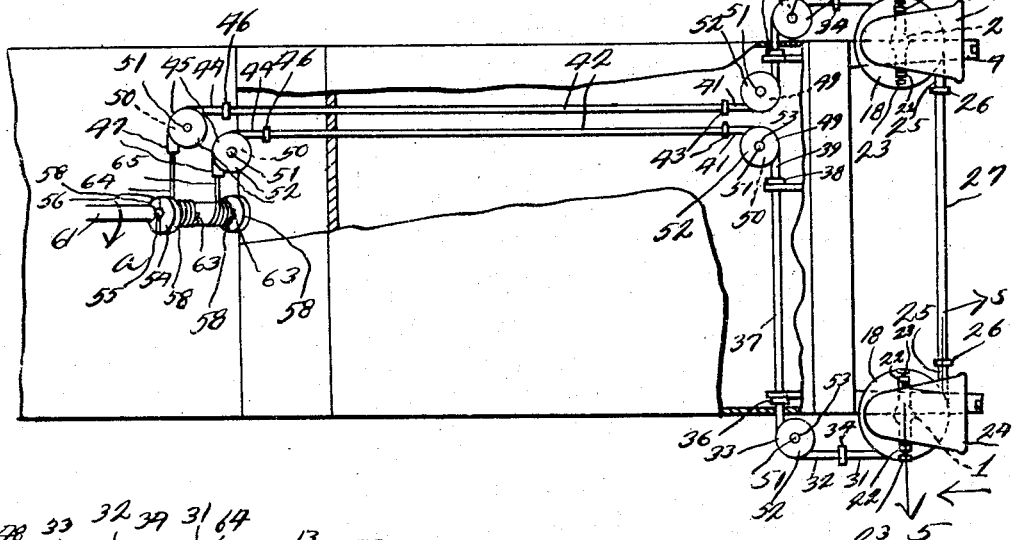
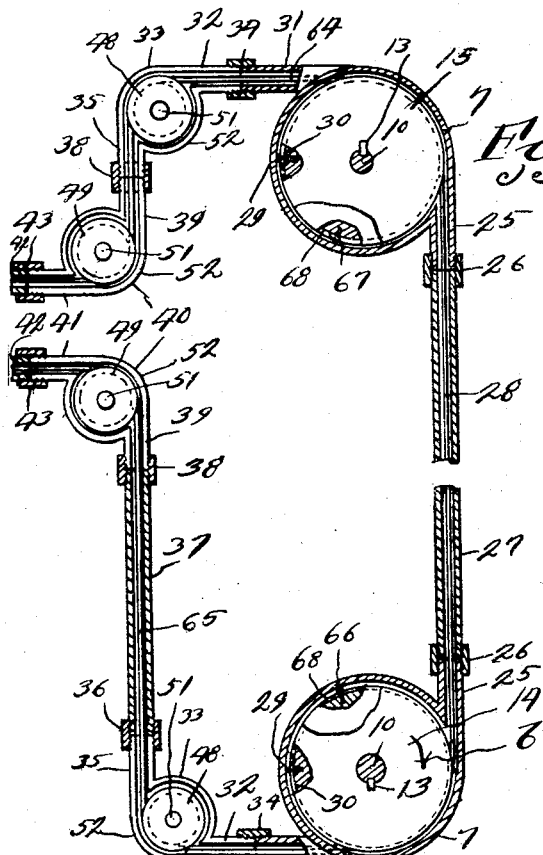
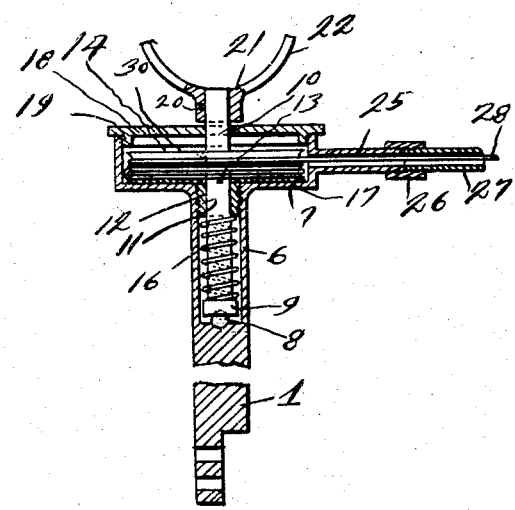
Inventor
F. L. Johnson
By D. Swift & Co.
Attorneys
Witnesses

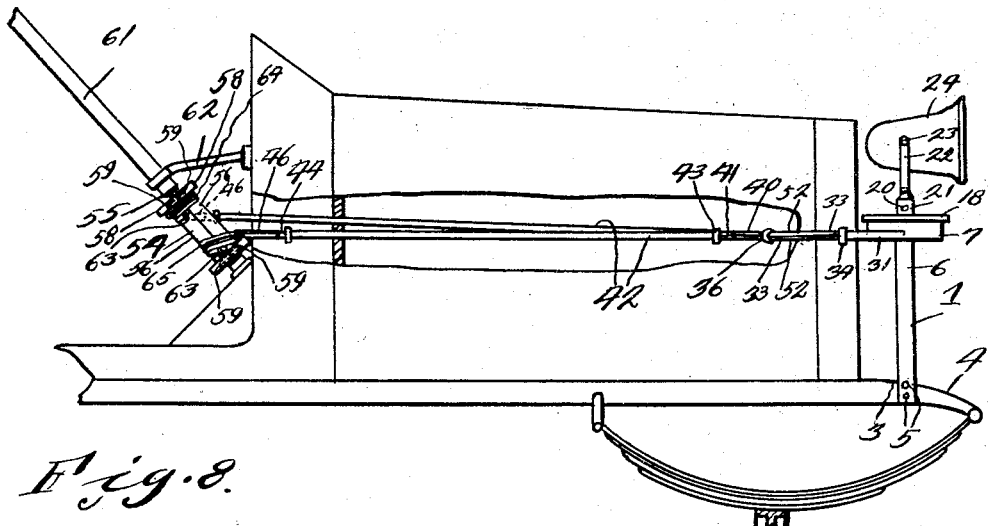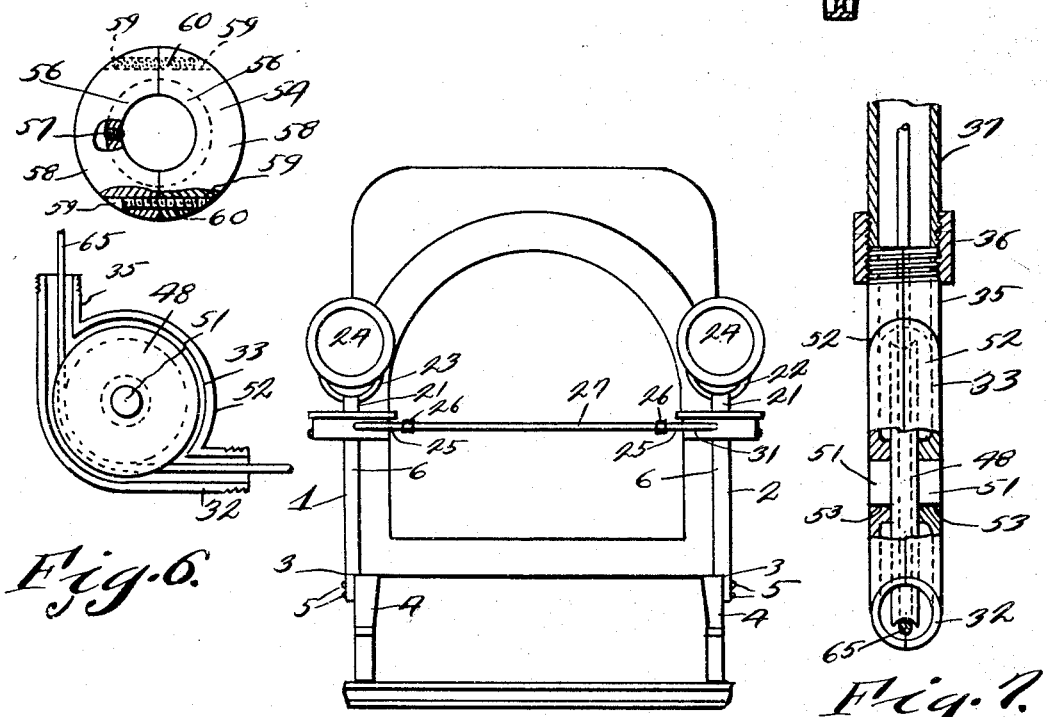

UNITED STATES PATENT OFFICE.

FREDERICK L. JOHNSON, OF SPRINGFIELD, MISSOURI.

DIRIGIBLE-LAMP MECHANISM FOR AUTOMOBILES.

1,245,729.　　　　　Specification of Letters Patent.　　Patented Nov. 6, 1917.

Application filed June 22, 1917.　Serial No. 176,338.

*To all whom it may concern:*

Be it known that I, FREDERICK L. JOHNSON, a citizen of the United States, residing at Springfield, in the county of Greene and State of Missouri, have invented a new and useful Dirigible-Lamp Mechanism for Automobiles; and I do hereby declare the following to be a full, clear, and exact description of the invention, such as will enable others skilled in the art to which it appertains to make and use the same.

This invention relates to an improved dirigible lamp mechanism for automobiles, and one of the objects of the invention is to provide an improved, simple and efficient device of this kind comprising improved connections between the lamps and the steering shaft of the steering column, whereby as the steering shaft is turned in one direction or the other, the lamps will be correspondingly turned, whereby the light from the lamps may follow the course traversed by the front wheels.

A further object of the invention is the provision of suitable tubular shields for said connections, thereby protecting the same.

A further object of the invention is the provision of split shields for incasing the pulleys over which said connections engage, whereby the various parts may be assembled.

In practical fields, the details of construction may necessitate alterations falling within the scope of what is claimed.

The invention comprises further features and combination of parts, as hereinafter set forth, shown in the drawings, and claimed.

A further object of the invention is to provide means whereby the lamps may rock freely in their bearings.

In the drawings:—

Figure 1 is a plan view of the forward end of an automobile, showing a part of the hood broken away, and parts thereon in section, illustrating the improved mechanism as applied to the lamps.

Fig. 2 is a view in side elevation of the forward end of an automobile, showing the hood broken away and parts in section, also disclosing the dirigible lamp mechanism applied.

Fig. 3 is a view in front elevation of an automobile, showing the lamps and portions of the dirigible lamp mechanism.

Fig. 4 is a sectional plan view through the forward parts of the connections between the lamps and the steering shaft, showing the tubular shields for said connections.

Fig. 5 is a sectional view on line 5—5 of Fig. 1, showing the mounting for the lamp, but omitting the lamp and its pivot screws.

Fig. 6 is a detail plan view of one of the pulleys over which one of the connections from one of the lamps to the steering shaft passes, illustrating the lower half of a casing for said pulley.

Fig. 7 is an edge view of the structure shown in Fig. 6, but illustrating both halves or sections of the casing for the pulley, and showing a tubular shield threaded to said casing, and also illustrating a portion of the casing in section, thereby disclosing the mounting of the pulley.

Fig. 8 is a detail view of the sectional drum for the steering shaft, showing parts in section, whereby the two halves of the drum may be connected.

Referring more especially to the drawings, 1 and 2 designate upright pieces, which have their lower parts recessed, as shown at 3, for the reception of the sides of the frame or running gear 4 of the automobile, there being suitable bolts or rivets 5, for securing the uprights 1 and 2 in place. The upper ends of the uprights 1 and 2 have tubular parts 6, which merge concentrically into the casings 7, which are larger in diameter than the tubular parts 6. Mounted upon the ball or thrust bearings 8 of the lower ends of the tubular parts 6, are the lower headed ends 9 of the rocking stud shafts 10, which pass through guides 11 of the bushings 12, which are threaded into the upper ends of the tubular parts 6. Keyed at 13 to the stud shafts 10 are the pulleys 14 and 15, which are capable of slight movements on the shafts 10, or, slight movements of the shafts 10 through the pulleys. Mounted upon the stud shafts and interposed between the heads 9 and the bushings 12, are coiled springs 16, thereby acting to hold the headed end 9 of the stud shafts yieldably upon the thrust bearings 8. Suitable fiber washers 17 are interposed between the pulleys 14 and 15, and the bottoms of the casings 7, so that the pulleys will freely rotate. Suitable disk closures 18 have their flanges 19 threaded into the casings 7, thereby preventing extreme excessive upward movement of the pulleys 14 and 15. Fixed by means of suitable screws 20 to the upper ends of the stud shafts 10, are the sleeve portions 21 of the lamp brackets 22, between which and on the studs or pivot screws 23, the lamps 24 are pivotally mounted. The casings 7 are provided with tubular extensions 25, extending toward each other, and connecting these extensions by means of the coupling sleeves 26, is a tube or pipe 27. Extending through the pipe 27 and the extensions 25, is a connecting cable or band 28, the opposite ends of which are secured by the screws 29 to the pulleys 14 and 15 respectively, so that said cable or band 28 will operate in the upper grooves 30 of said pulleys 14 and 15. Extending from the casings 7 rearwardly are tubular extensions 31 to which the extensions 32 of the casings 33 are connected by the coupling sleeves 34. The casings 33 have tubular extensions 35 at right angles to the extensions 32. Connected to one of the extensions 35 by a coupling sleeve 36, is a connecting tube 37, and connected to the other extension 35 and to the connecting tube 37 by means of the coupling sleeves 38, are the extensions 39 of the casings 40. These casings 40 have extensions 41 at right angles to the extensions 39. Connecting tubes 42 are connected to the extensions 41 by the coupling sleeves 43, and which tubes 42 are in turn connected to the extensions 44 of the casings 45 by the coupling sleeves 46. The casings 45 have extensions 47 at right angles to the extensions 44. Mounted in the casings 33, 40 and 45, are suitable pulleys 48, 49 and 50, and these pulleys are provided with hubs 51. Each casing 33, 40 and 45 is constructed in two half sections connected concentrically with each other. Said half sections 52 are provided with axially arranged bearing openings 53 for the reception of the hubs 51 of the pulley 48. It is to be observed that by constructing each casing in the two half sections, as indicated, the pulleys may be easily mounted therein. By provision of the sleeve couplings, the half sections of the casings are held together concentrically, whereby the pulleys will freely rotate. A suitable drum 54 is provided for the steering shaft 55. The drum 54 is constructed in two sections 56, semi-circular in cross section, whereby the drum may be fitted to the steering shaft 55 easily, there being a set screw 57 passing through the cylindrical wall of one of the sections 56 to secure the drum to the steering shaft. The flanges 58 of the ends of the semi-cylindrical sections are provided with threaded openings 59, for the reception of the screws 60, to secure the sections together and to provide additional means for holding the drum tight upon the steering shaft. Referring to Fig. 2, it is to be observed that the lower portion of the steering column 61 (in which the steering shaft is rockably mounted) is cut away, whereby the drum 54 is secured to the steering shaft. The lower end of the upper section of the steering column 61 is mounted in a bearing of the bracket 62, which is secured to and extended from the front dash of the automobile. However, the drum may be mounted upon the steering shaft in any other suitable manner other than cutting away the lower part of the steering column. Secured to the drum as at 63 and wound thereabout in opposite directions are suitable cables or cords or the like 64 and 65, which pass through the casings 45, 40 and 33, and through the tubular connections of said casings, and the other ends of the cables or cords are secured to the pulleys 14 and 15 respectively by means of the screws 66 and 67, whereby said cables may engage and operate in the lower grooves 68 of said pulleys 14 and 15.

When the steering shaft 55 is turned to the right, as shown by the arrow $a$ in Fig. 1, wrapping the cable 65 around the drum, hence imparting a pulling action on said cable, the stub shaft of the pulley 14 is turned to the right, as indicated by the arrow $b$. Owing to the connection 28, between the pulleys 14 and 15, both lamps will turn to the right, thereby following the course of the front wheels of the automobile. When the pulley 14 turns to the right, as indicated by the arrow $b$ and connection 28 pulls the pulley 15 correspondingly, the cable 64 becomes unwound from the drum. It is to be observed that by a rotation of the steering shaft to the left, opposite to that indicated by the arrow $a$, the lamps will be oscillated correspondingly, to follow the course of the front wheel of the automobile.

The invention having been set forth, what is claimed as new and useful, is:—

1. In a dirigible lamp mechanism for automobiles, a pair of brackets mounted upon the frame of the automobile, and having tubular parts at their upper ends, adjustable bushings in said tubular parts, stud shafts carrying lamps guided through the bushings and having headed lower ends, thrust bearings for said headed lower ends, yieldable means between the bushings and shoulders of the headed ends, for holding the threaded ends on their thrust bearings, pulleys mounted upon the stud shafts and having a cross connection, and means connected to said pulleys for moving the lamps correspondingly with the steering means of the automobile.

2. In a dirigible lamp mechanism for automobiles, the combination with the steering shaft of a pair of lamps supported on the front of the automobile, a pair of pulleys connected to and movable with said lamps, across connection between said pulleys, a housing for said pulleys, having a tubular housing for the cross connection, a drum on the steering shaft, cable connections between the drum and the lamps, whereby as the steering shaft is turned in one direction or the other, said lamps will be moved correspondingly, pulleys over which said cable connections engage, housing for said last named pulleys, and tubular housings between the various last named pulleys for said cable connections, and tubular housings between the housings of two of the last named pulleys and the housings of the pulleys which are movable with the lamps.

In testimony whereof I have signed my name to this specification in the presence of two subscribing witnesses.

FRED L. JOHNSON.

Witnesses:
 DORA W. TAYLOR,
 EARL E. NIXON.